(12) United States Patent
Wang et al.

(10) Patent No.: US 11,404,090 B2
(45) Date of Patent: Aug. 2, 2022

(54) VIDEO PROCESSING METHOD, VIDEO PLAYING METHOD, DEVICES AND STORAGE MEDIUM

(71) Applicant: BEIJING XIAOMI MOBILE SOFTWARE CO., LTD., Beijing (CN)

(72) Inventors: Qian Wang, Beijing (CN); Jiakang Deng, Beijing (CN); Binbin Lin, Beijing (CN); Yu Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/810,369

(22) Filed: Mar. 5, 2020

(65) Prior Publication Data
US 2021/0090610 A1   Mar. 25, 2021

(30) Foreign Application Priority Data

Sep. 20, 2019   (CN) .......................... 201910894523.8

(51) Int. Cl.
*G11B 27/10* (2006.01)
*H04N 5/77* (2006.01)

(52) U.S. Cl.
CPC ............ *G11B 27/10* (2013.01); *H04N 5/772* (2013.01)

(58) Field of Classification Search
CPC ................................ G11B 27/10; H04N 5/772
See application file for complete search history.

(56) References Cited

U.S. PATENT DOCUMENTS

| 2009/0116817 | A1* | 5/2009 | Kim | H04N 21/4312 386/241 |
| 2009/0282454 | A1* | 11/2009 | Ekstrand | H04N 21/6125 725/134 |
| 2010/0150520 | A1* | 6/2010 | Hopwood | G11B 27/34 386/278 |
| 2015/0286875 | A1* | 10/2015 | Land | G11B 27/28 382/103 |
| 2015/0287435 | A1 | 10/2015 | Land et al. | |
| 2017/0163861 | A1 | 6/2017 | Land et al. | |

(Continued)

OTHER PUBLICATIONS

Extended European Search Report dated Sep. 29, 2020 in European Patent Application No. 20162012.7, citing documents AA through AD therein.

*Primary Examiner* — Girumsew Wendmagegn
(74) *Attorney, Agent, or Firm* — Oblon, McClelland, Maier & Neustadt, L.L.P.

(57) ABSTRACT

Aspects of the invention provided a video processing method, a video playing method, devices thereof, and a storage medium. The video processing method is applied to a terminal device and can include that a video-frame tagging operation is detected during recording of a video. The video-frame tagging operation can tag a video frame in a recorded video at different times during recording of the video. The video frame can be tagged at different times during recording of the video according to the video-frame tagging operation. A final recorded video is generated based on the tagged video frame and an untagged video frame. The video frame is tagged through the detected video-frame tagging operation and the final recorded video is generated, so that a wonderful moment in the video can be rapidly located based on the tag of the video frame during video playback, and user experience may be improved.

6 Claims, 12 Drawing Sheets

(56) References Cited

U.S. PATENT DOCUMENTS

2018/0035137 A1    2/2018  Chen et al.
2018/0302694 A1*  10/2018  Noronha .......... H04N 21/47205
2019/0019534 A1    1/2019  Land et al.

* cited by examiner

VIDEO PROCESSING METHOD, VIDEO PLAYING METHOD, DEVICES AND STORAGE MEDIUM

CROSS-REFERENCE TO RELATED APPLICATION

This application is based upon and claims priority to Chinese patent application No. 201910894523.8 filed on Sep. 20, 2019, the entire contents of which are incorporated herein by reference.

TECHNICAL FIELD

The present disclosure generally relates to a computer communication technology, and more particularly, to a video processing method, a video playing method, devices and a storage medium.

BACKGROUND

Mobile terminal has become an indispensable part of people's lives, work and study. More and more users select cameras of mobile terminals for video acquisition and store acquired videos in corresponding storage spaces. However, during video playback, wonderful moments in the videos may not be rapidly located.

SUMMARY

The present disclosure provides a video processing method, a video displaying method, and devices and a storage medium. According to a first aspect of embodiments of the present disclosure, a video processing method is provided, which may be applied to a terminal device. The video processing method can include a video-frame tagging operation that is detected in a process of recording a video, the video-frame tagging operation being configured to tag a video frame in a recorded video at different times in the process of recording the video. The video frame is tagged at different times in the process of recording the video according to the video-frame tagging operation, and a final recorded video is generated based on the tagged video frame and an untagged video frame.

According to a second aspect of the embodiments of the present disclosure, a video playing method can be provided, which may be applied to a terminal device and can include, in response to a video output operation for a final recorded video acquired by any video processing method of the first aspect being detected, the final recorded video can be output based on the video output operation. A video frame and the time axis are displayed on a video display interface, and a tag of the video frame is displayed on the time axis, a target-video-frame output operation for the tag of the video frame is detected. Further, a skip from the video frame presently displayed on the video display interface to a target video frame can be made according to the target-video-frame output operation, and video frames corresponding to each recording moment in the final recorded video are continuously output starting from the target video frame according to a time sequence.

According to a third aspect of the embodiments of the present disclosure, a video processing device is provided that can include a processor and a memory configured to store instructions executable by the processor. The processor can be configured to execute the operations of the video processing method in the first aspect as described above.

According to a fourth aspect of the embodiments of the present disclosure, a video playing device is provided that can include a processor, and a memory configured to store instructions executable by the processor. The processor can be configured to execute the operations of the video playing method in the second aspect as described above.

According to a fifth aspect of the embodiments of the present disclosure, a non-transitory computer-readable storage medium is provided, which has instructions stored thereon that, when executed by a processor of a video processing device, enable the video processing device to execute any video processing method of the first aspect, and that, when executed by a processor of a video playing device, enable the video playing device to execute the video playing method of the second aspect.

The technical solutions provided by embodiments of the present disclosure may have beneficial effects. For example, a video frame may be tagged through a detected video-frame tagging operation and a final recorded video may be generated, so that a wonderful moment in a video can be rapidly located based on the tag of the video frame during video playback, and user experience may be improved.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

An embodiment provides a video processing method. The method may be applied to a terminal device. Here, the terminal device may include a mobile terminal device and a fixed terminal device, for example, a mobile phone, a tablet computer, a Personal Computer (PC), and the like.

Figure 1:
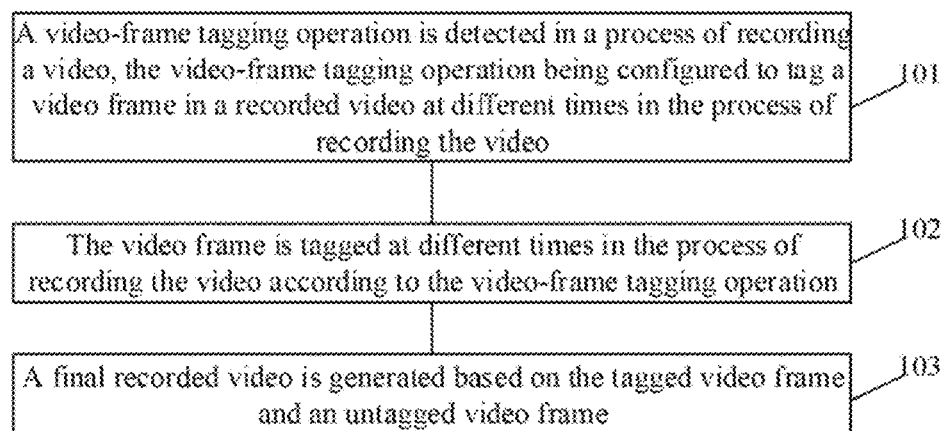
FIG. 1 is a first flowchart showing a video processing method according to an exemplary embodiment.

FIG. 1 is a first flowchart showing a video processing method according to an exemplary embodiment. As shown in FIG. 1, the method includes the following operations.

In operation 101, a video-frame tagging operation is detected in a process of recording a video, the video-frame tagging operation being configured to tag a video frame in a recorded video at different times in the process of recording the video. It is to be noted that a video frame is a basic unit of a video file, a video frame is a static image, multiple video frames that are continuously acquired may form a video file and a dynamic effect may be achieved when each video frame is rendered. Here, the video-frame tagging operation refers to a detected tagging operation on a certain video frame in the video recording process.

In operation 102, the video frame is tagged at different times in the process of recording the video according to the video-frame tagging operation. The video frame may be tagged at different times in the process of recording the video to generate a video tag. It is to be noted that the video tag is configured to tag the video frame. That is, in the video recording process, when the tagging operation for a certain video frame is detected, a video tag corresponding to the video frame may be generated to tag the video frame. For example, a user, when watching a wonderful image on a video recording interface in the video recording process, may input a video tagging operation through the video recording interface to generate a video tag for the image. Therefore, the user may rapidly locate the image through the video tag during video playback, and user experience may be improved.

In operation 103, a final recorded video is generated based on the tagged video frame and an untagged video frame. In the embodiment, a video tag may be generated through a detected video-frame tagging operation, and a final recorded video, i.e., a final recorded video file, may be generated based on the video tag and the video frame, so that a wonderful moment in a video may be rapidly located based on the video tag during video playback, and the user experience may be improved.

Figure 2A:
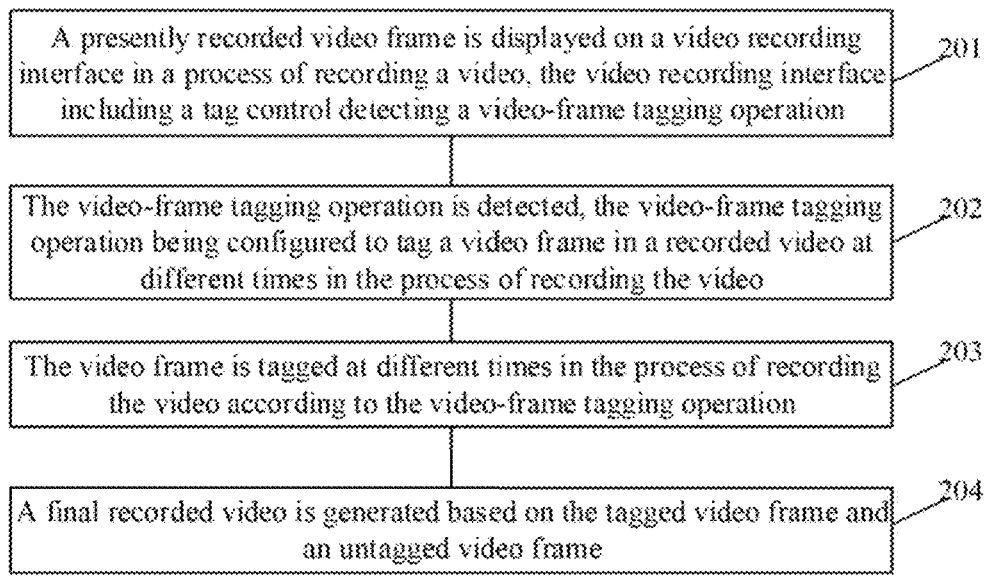
FIG. 2A is a second flowchart showing a video processing method according to an exemplary embodiment.

An embodiment provides a video processing method. FIG. 2A is a second flowchart showing a video processing method according to an exemplary embodiment. As shown in FIG. 2A, the method includes the following operations.

In operation 201, a presently recorded video frame is displayed on a video recording interface in a process of recording a video, the video recording interface including a tag control detecting a video-frame tagging operation. It is to be noted that, in the video recording process, the presently recorded video frame may be displayed on the video recording interface, and the tag control configured to detect the video-frame tagging operation may be displayed on the video recording interface. Therefore, a user may directly and rapidly tag the presently displayed video frame, and convenience for the user may be upgraded.

Figure 2B:
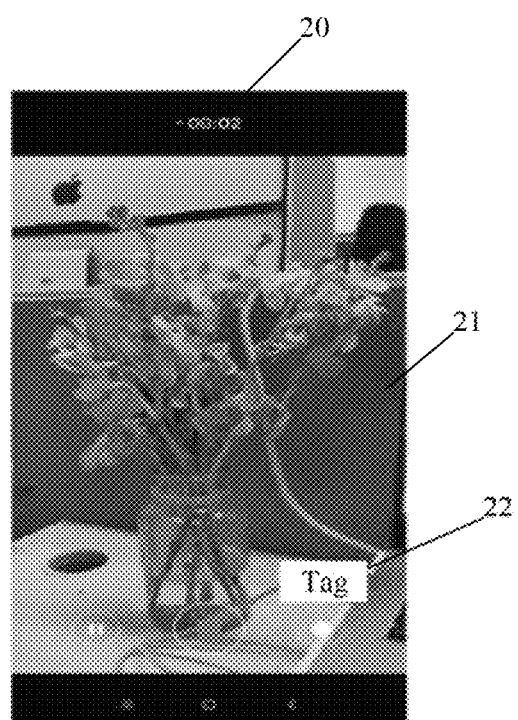
FIG. 2B is a schematic diagram illustrating a video recording interface according to an exemplary embodiment.

FIG. 2B is a schematic diagram illustrating a video recording interface according to an exemplary embodiment. As shown in FIG. 2B, the video recording interface 20 includes a video recording region 21 and a tag control 22. In an implementation process, a user may input a video-frame tagging operation by the tag control 22. The video-frame tagging operation may be an operation of clicking the tag control 22, for example, a single click, a double click or a long-press operation over the tag control 22. The tag control 22 may be kept displayed on the video recording interface in the video recording process.

In an embodiment, the tag control may also be displayed on the video recording interface when a display operation is detected for the video recording interface, and the tag control may be hidden when the tag control is not needed, so as to make the video recording interface clean and attractive. In addition, when the tag control is displayed, the tag control may be displayed in a region outside the video recording region, for example, a top end of the video recording region or a bottom end of the video recording region, to avoid influence on browsing of the presently recorded video frame by the user.

In operation 202, the video-frame tagging operation is detected, the video-frame tagging operation being configured to tag a video frame in a recorded video at different times in the process of recording the video.

In operation 203, the video frame is tagged at different times in the process of recording the video according to the video-frame tagging operation.

In operation 204, a final recorded video is generated based on the tagged video frame and an untagged video frame.

Figure 3:
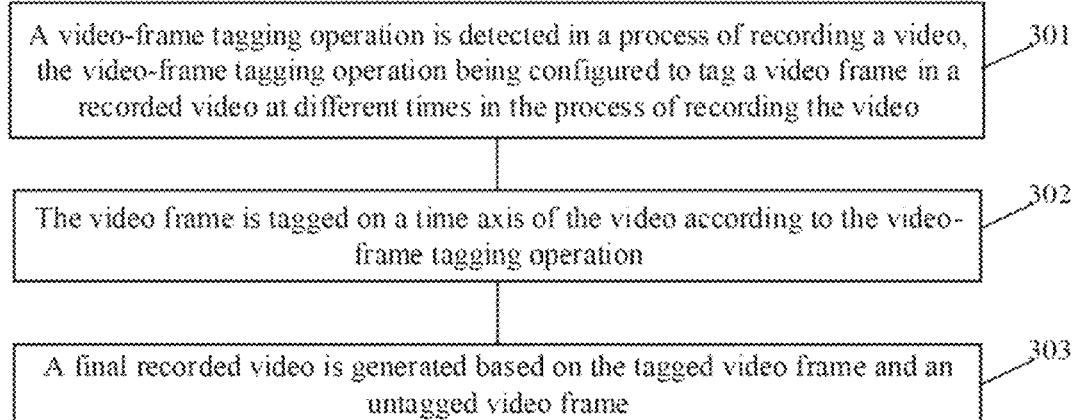
FIG. 3 is a third flowchart showing a video processing method according to an exemplary embodiment.

An embodiment provides a video processing method. FIG. 3 is a third flowchart showing a video processing method according to an exemplary embodiment. As shown in FIG. 3, the method includes the following operations.

In operation 301, a video-frame tagging operation is detected in a process of recording a video, the video-frame tagging operation being configured to tag a video frame in a recorded video at different times in the process of recording the video. In an embodiment, the method may further include that a presently recorded video frame is displayed on a video recording interface in the video recording process, the video recording interface including a tag control detecting the video-frame tagging operation. Therefore, a user may directly and rapidly tag the presently displayed video frame, and convenience for the user may be improved.

In operation 302, the video frame is tagged on a time axis of the video according to the video-frame tagging operation. The video frame may be tagged on the time axis of the video, namely a video tag may be added to the time axis of the video. It is to be noted that, in response to that the tagging operation for the video frame is detected, the video tag generated according to the tagging operation may be added to the time axis of the video. When the video is played, the time axis may be displayed to the user in form of a control, and adding the video tag to the time axis of the video may make it convenient for the user to rapidly locate the corresponding video frame through the video tag on the time axis.

In operation 303, a final recorded video is generated based on the tagged video frame and an untagged video frame.

Figure 4:
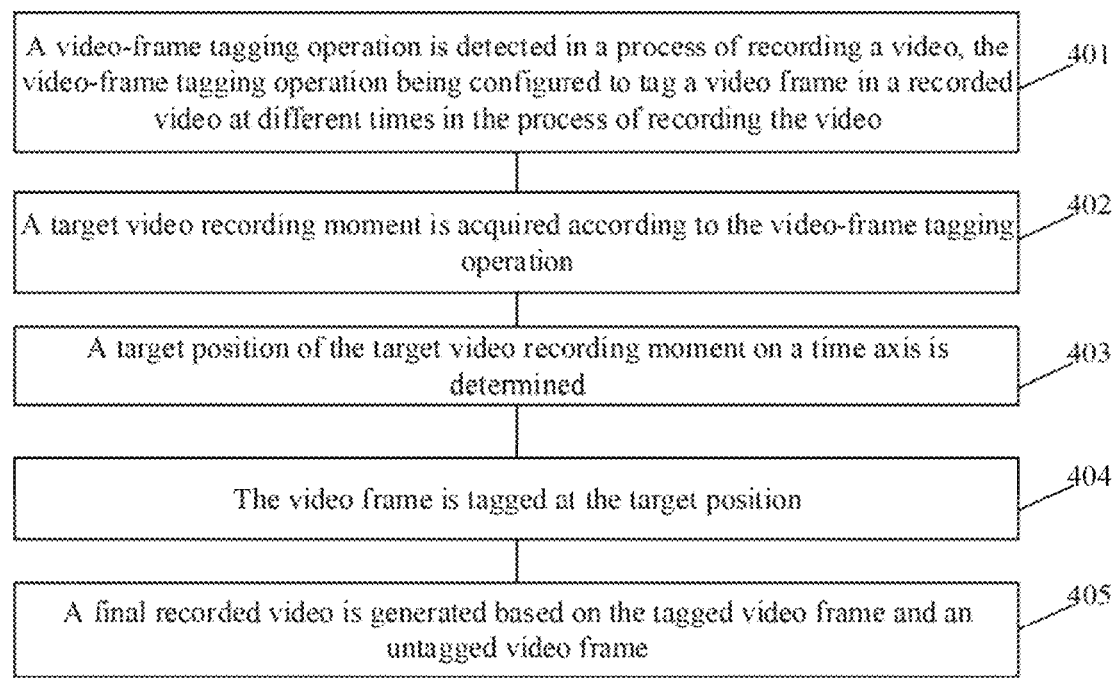
FIG. 4 is a fourth flowchart showing a video processing method according to an exemplary embodiment.

An embodiment provides a video processing method. FIG. 4 is a fourth flowchart showing a video processing method according to an exemplary embodiment. As shown in FIG. 4, the method includes the following operations.

In operation 401, a video-frame tagging operation is detected in a process of recording a video, the video-frame tagging operation being configured to tag a video frame in a recorded video at different times in the process of recording the video. In an embodiment, the method may further include that a presently recorded video frame is displayed on a video recording interface in the video recording process, the video recording interface including a tag control detecting the video-frame tagging operation. Therefore, a user may directly and rapidly tag the presently displayed video frame, and convenience for the user may be improved.

In operation 402, a target video recording moment is acquired according to the video-frame tagging operation. It is to be noted that the target video recording moment refers to a moment when the video frame presently displayed on the video recording interface is recorded when the video-frame tagging operation is received.

In operation 403, a target position of the target video recording moment on a time axis is determined. It is to be noted that the time axis may be formed by connecting recording moments for each video frame in a recorded video file in series according to a time sequence, and the recording moment for each video frame corresponds to a position on the time axis.

In operation 404, the video frame is tagged at the target position. At the target position, the video frame may be tagged and a video tag may be added. It is to be noted that, after the target position of the target video recording moment on the time axis is determined, the video tag may be added to the target position, so that the user may rapidly locate a video frame expected to be watched based on the video tag corresponding to the target position on the time axis during video playback.

In operation 405, a final recorded video is generated based on the tagged video frame and an untagged video frame.

Figure 5:
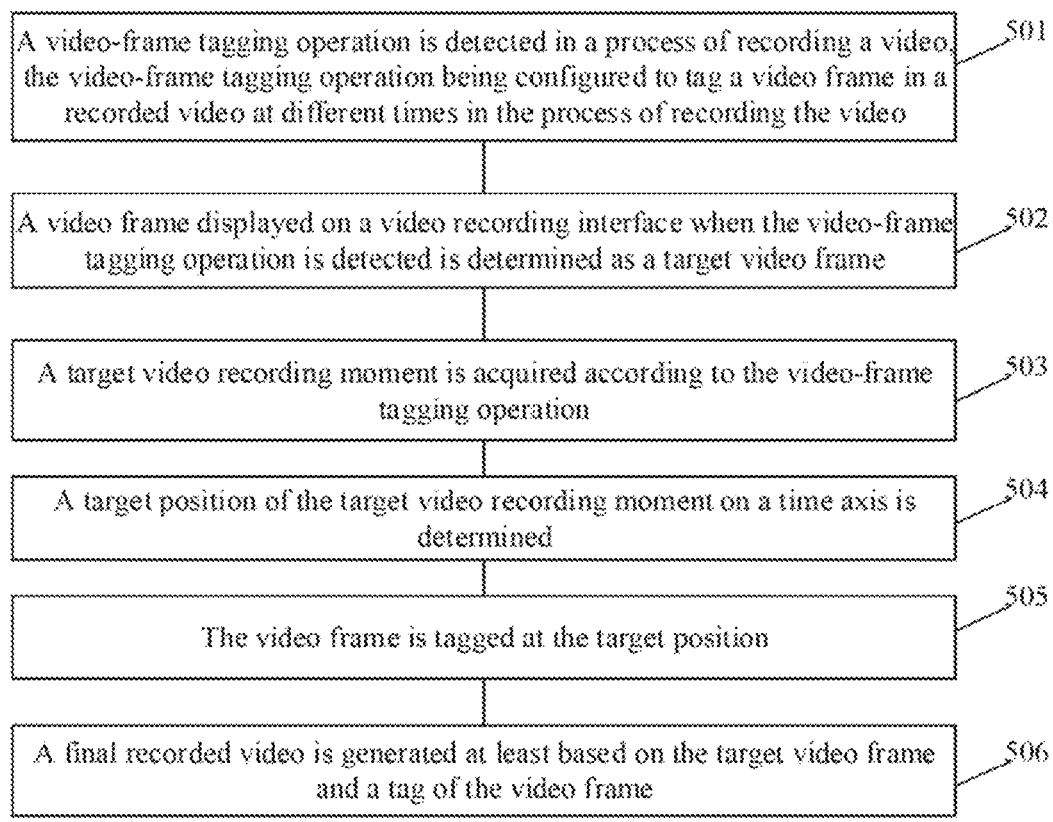
FIG. 5 is a fifth flowchart showing a video processing method according to an exemplary embodiment.

An embodiment provides a video processing method. FIG. 5 is a fifth flowchart showing a video processing method according to an exemplary embodiment. As shown in FIG. 5, the method includes the following operations.

In operation 501, a video-frame tagging operation is detected in a process of recording a video, the video-frame tagging operation being configured to tag a video frame in a recorded video at different times in the process of recording the video. In an embodiment, the method may further include that a presently recorded video frame is displayed on a video recording interface in the video recording process, the video recording interface including a tag control detecting the video-frame tagging operation. Therefore, a user may directly and rapidly tag the presently displayed video frame, and convenience for the user may be improved.

In operation 502, a video frame displayed on a video recording interface when the video-frame tagging operation is detected is determined as a target video frame.

In operation 503, a target video recording moment is acquired according to the video-frame tagging operation.

In operation 504, a target position of the target video recording moment on a time axis is determined.

In operation 505, the video frame is tagged at the target position.

In operation 506, a final recorded video is generated at least based on the target video frame and a tag of the video frame. In the embodiment, the video frame displayed on the video recording interface when the video-frame tagging operation is detected may be determined as the target video frame, and a video file may be generated based on the target video frame and the video tagging operation. Since the video tag is in a corresponding relationship with the target video frame, the corresponding target video frame may be acquired based on the video tag for the user to rapidly locate the corresponding target video frame during video playback, thereby upgrading the convenience of the user for video watching.

In an embodiment, the operation that the final recorded video is generated based on the tagged video frame and the untagged video frame may include that, in response to that a video-recording ending instruction for terminating recording of the video is detected, the final recorded video is generated by the tagged video frame and the untagged video frame according to a time sequence. The method may further include that, responsive to an instruction for storing the final recorded video, the final recorded video is stored in the terminal device.

It is to be noted that, when the video-recording ending instruction for terminating recording of the video is detected, video coding may be performed on the tagged video frame and the untagged video frame to form a video file with the video tag set by the user and stored in the terminal device for the user-side terminal to locally decode and play. For example, the video file may be stored in an album or other storage space of the terminal device. In another embodiment, the recorded video file may also be shared to a social platform for other users to access. Integrity of the video may be ensured on the basis of tagging the video file.

Figure 6:
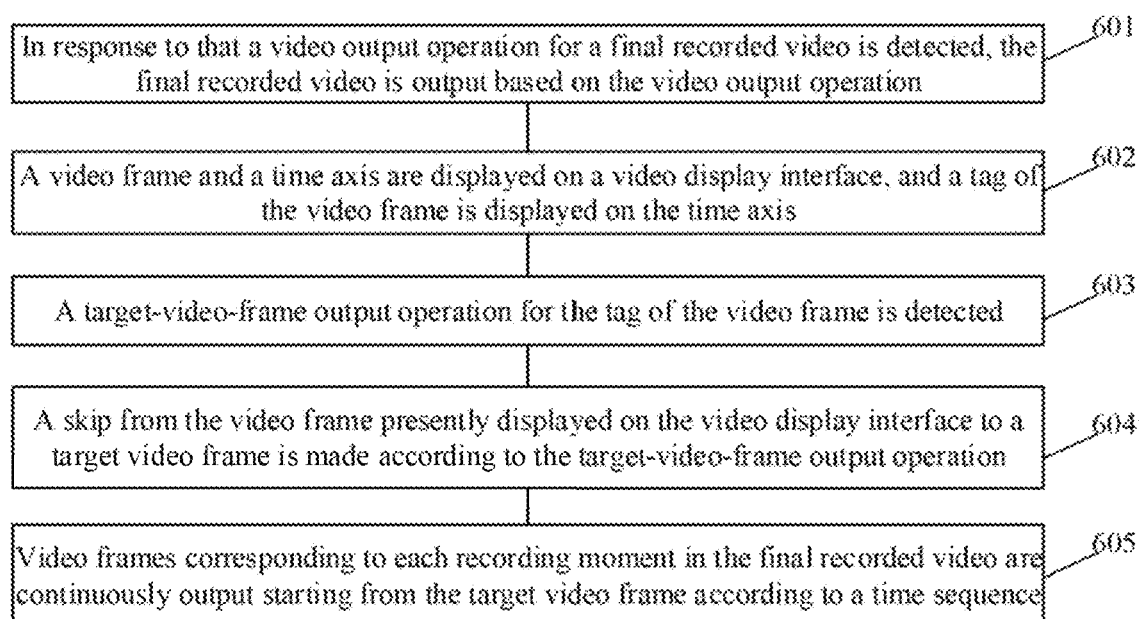
FIG. 6 is a flowchart showing a video playing method according to an exemplary embodiment.

An embodiment provides a video playing method. FIG. 6 is a flowchart showing a video playing method according to an exemplary embodiment. As shown in FIG. 6, the method includes the following operations.

In operation 601, in response to that a video output operation for a final recorded video is detected, the final recorded video is output based on the video output operation.

In operation 602, a video frame and a time axis are displayed on a video display interface, and a tag of the video frame is displayed on the time axis.

In operation 603, a target-video-frame output operation for the tag of the video frame is detected.

In operation 604, a skip from the video frame presently displayed on the video display interface to a target video frame is made according to the target-video-frame output operation.

In operation 605, video frames corresponding to each recording moment in the final recorded video are continuously output starting from the target video frame according to a time sequence. It is to be noted that the video tag may have been born on the time axis of the video file and the time axis may be displayed on the video display interface in form of a control. Therefore, when the video file is played, a user may see the video tag and, when necessary, input a triggering operation for the video tag to switch the video frame presently displayed on the video display interface to the target video frame. In such a manner, highlights expected to be watched by the user in the video file may be accurately located.

In an embodiment, the operation that the tag of the video frame is displayed on the time axis may include at least one of the following operations: the tag of the video frame is displayed on the time axis in form of a text; and the tag of the video frame is displayed on the time axis in form of a picture, content of the text and content of the picture forming a corresponding relationship with the presently displayed video frame.

The tag of the video frame can be a video tag, the video tag may be displayed on the time axis in form of the text or the picture, and the content in the text and the context in the picture may form a corresponding relationship with the presently displayed video frame. For example, it is prompted on the time axis through a corresponding text or picture that a goal is scored in a football match or the finish line is crossed in a dash race at a present moment. Therefore, the user may directly determine the content to be watched from the time axis and rapidly locate a wonderful moment in the video based on the video tag, and the user experience may be improved.

Figure 7A:
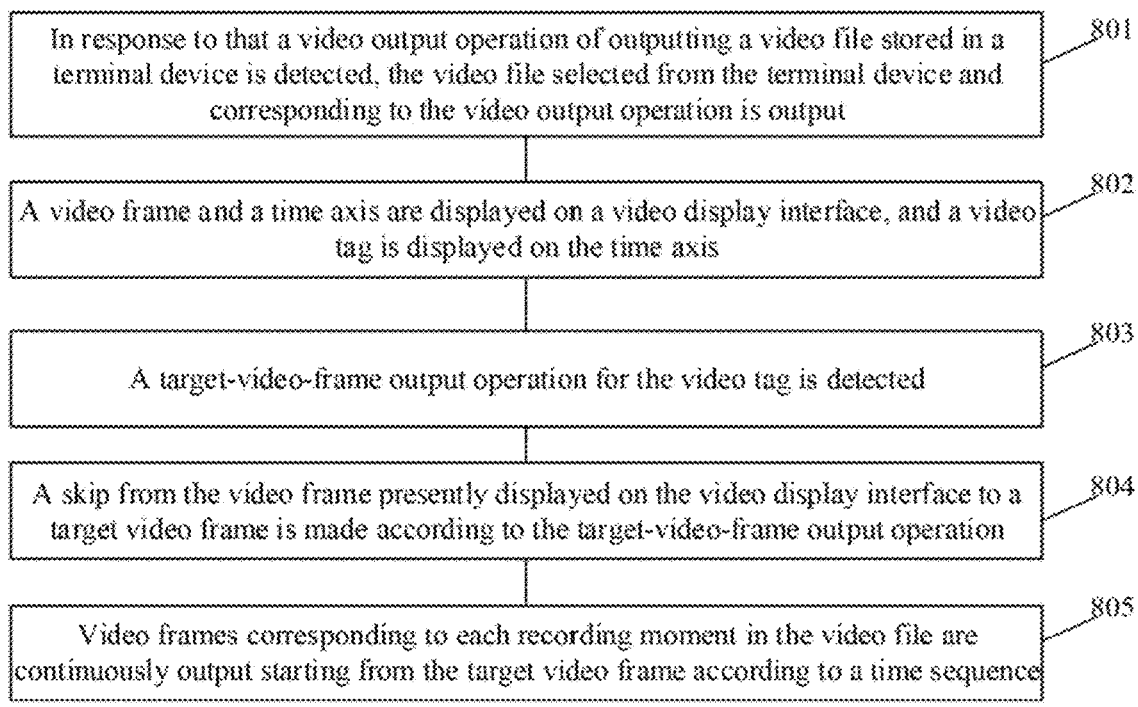
FIG. 7A is a flowchart showing a video processing and playing method according to an exemplary embodiment.

An embodiment provides a video processing method. FIG. 7A is a flowchart showing a video processing and playing method according to an exemplary embodiment. As shown in FIG. 7A, the method includes the following operations.

In operation 801, in response to that a video output operation of outputting a video file stored in a terminal device is detected, the video file selected from the terminal device and corresponding to the video output operation is output.

In operation 802, a video frame and a time axis are displayed on a video display interface, and a video tag is displayed on the time axis.

In operation 803, a target-video-frame output operation for the video tag is detected.

In operation 804, a skip from the video frame presently displayed on the video display interface to a target video frame is made according to the target-video-frame output operation.

In operation 805, video frames corresponding to each recording moment in the video file are continuously output starting from the target video frame according to a time sequence.

It is to be noted that, since the video tag is displayed on the time axis of the video file, a user may directly execute the target-video-frame output operation on the video tag on the time axis in a video playing process. The target-video-frame output operation may be an operation of clicking the video tag, for example, a single click, a double click, or a long-press operation.

When the target-video-frame output operation is detected, a skip from the presently displayed video frame to the target video frame corresponding to the video tag may be directly made. After skip to the target video frame, the video frames corresponding to each recording moment in the video file may be directly continuously output starting from the target video frame according to the time sequence.

In an embodiment, after skipping from the video frame presently displayed on the video display interface to the target video frame, the video file may also be controlled in a paused state, the target video frame may be displayed on the video display interface, and after a playing operation input by the user is received, the video frames corresponding to each recording moment in the video file may be continuously output starting from the target video frame which is taken as a starting position according to the time sequence.

Figure 7B:
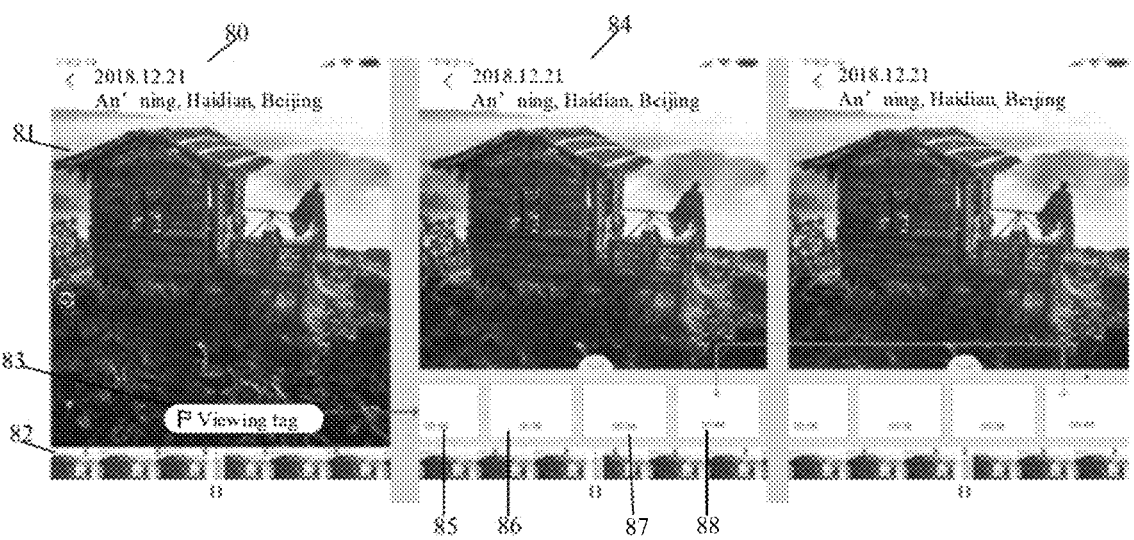
FIG. 7B is a schematic diagram illustrating a video display interface according to an exemplary embodiment.

FIG. 7B is a schematic diagram illustrating a video display interface according to an exemplary embodiment. As shown in FIG. 7B, the video display interface 80 includes a video playing region 81, a time axis 82 and a tag control 83 identified with a viewing tag.

In a process of playing a video in an album, the tag control 83 may be clicked to extend a video tag and the video tag may be displayed on the video display interface 80. Moreover, the video tag may be slid to view more video tags. The video tag may also be clicked to rapidly locate a playing progress corresponding to the video tag. For example, a video tag 85, a video tag 86, a video tag 87 and a video tag 88 are displayed on the video display interface 84, and different video tags correspond to different video frames respectively. For example, the video tag 85 corresponds to a video frame that is the $6^{th}$ second of the video, the video tag 86 corresponds to a video frame that is the $18^{th}$ second of the video, the video tag 87 corresponds to a video frame that is the $36^{th}$ second of the video, and the video tag 88 corresponds to a video frame that is the $44^{th}$ second of the video. When different video tags are clicked, different video frames may be displayed on the video display interface. For example, if the video tag 88 is clicked, the video frame corresponding to the video tag 88, i.e., the video frame that is the $44^{th}$ second, may be located, and the video frame may be displayed on the video display interface.

In the embodiment, when a video is played on a video play interface, an time axis may be displayed on the video display interface in form of a control, and a video tag may be displayed on the time axis, so that a user may rapidly locate the corresponding video frame according to the video tag displayed on the time axis, and convenience of the user for video watching can be improved.

Figure 8:
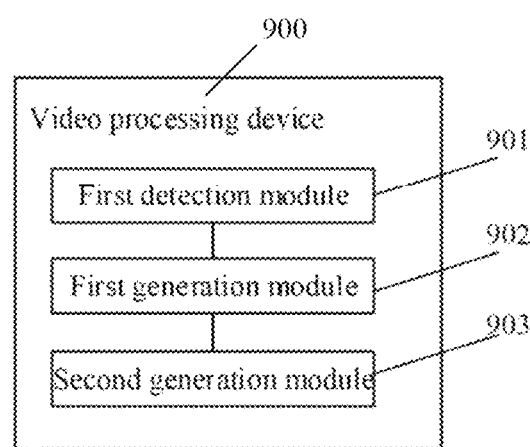
FIG. 8 is a block diagram of a video processing device according to an exemplary embodiment.

FIG. 8 is a block diagram of a video processing device according to an exemplary embodiment. As shown in FIG. 8, the video processing device 900 can include a first detection module 901 that is configured to detect a video-frame tagging operation in a process of recording a video, the video-frame tagging operation being configured to tag a video frame in a recorded video at different times in the process of recording the video, a first generation module 902 that is configured to tag the video frame at different times in the process of recording the video according to the video-frame tagging operation, and a second generation module 903 that is configured to generate a final recorded video based on the tagged video frame and an untagged video frame.

In an embodiment, the first generation module 902 can include a first generation submodule that is configured to tag the video frame on the time axis of the video according to the video-frame tagging operation. In an embodiment, the first generation submodule 902 is specifically configured to acquire a target video recording moment according to the video-frame tagging operation, determine a target position of the target video recording moment on the time axis, and tag the video frame at the target position.

In an embodiment, the second generation module is specifically configured to, in response to that a video-recording ending instruction for terminating recording of the video is detected, generate the final recorded video by the tagged video frame and the untagged video frame according to a time sequence. Further, the device may can include a storage module that is configured to, responsive to an instruction for storing the final recorded video, store the final recorded video in a terminal device.

Figure 9:
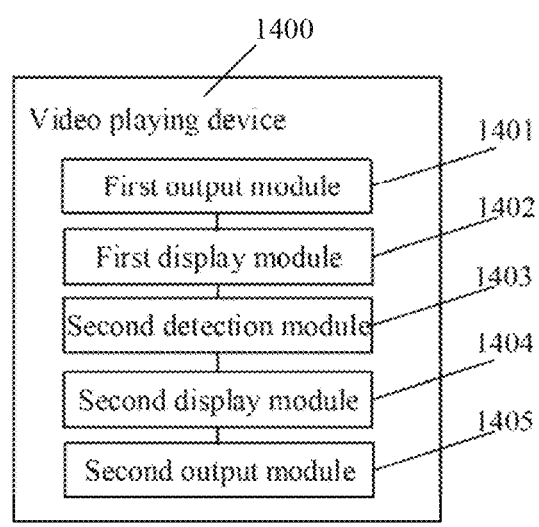
FIG. 9 is a block diagram of a video playing device according to an exemplary embodiment.

FIG. 9 is a block diagram of a video playing device according to an exemplary embodiment. As shown in FIG. 9, the video playing device 1400 mainly includes a first output module 1401 that is configured to, in response to that a video output operation for a final recorded video is detected, output the final recorded video based on the video output operation, and a first display module 1402 that is configured to display a video frame and a time axis on a video display interface and display a tag of the video frame on the time axis. The video playing device 1400a can further include a second detection module 1403 that is configured to detect a target-video-frame output operation for the tag of the video frame, a second display module 1404 that is configured to make a skip from the video frame presently displayed on the video display interface to a target video frame according to the target-video-frame output operation, and a second output module 1405 that is configured to continuously output, starting from the target video frame, video frames corresponding to each recording moment in the final recorded video according to a time sequence.

In an embodiment, the first display module 1402 is specifically configured to execute at least one of the following operations displaying the tag of the video frame on the time axis in form of a text, and displaying the tag of the video frame on the time axis in form of a picture, content of the text and content of the picture forming a corresponding relationship with the presently displayed video frame.

Figure 10:
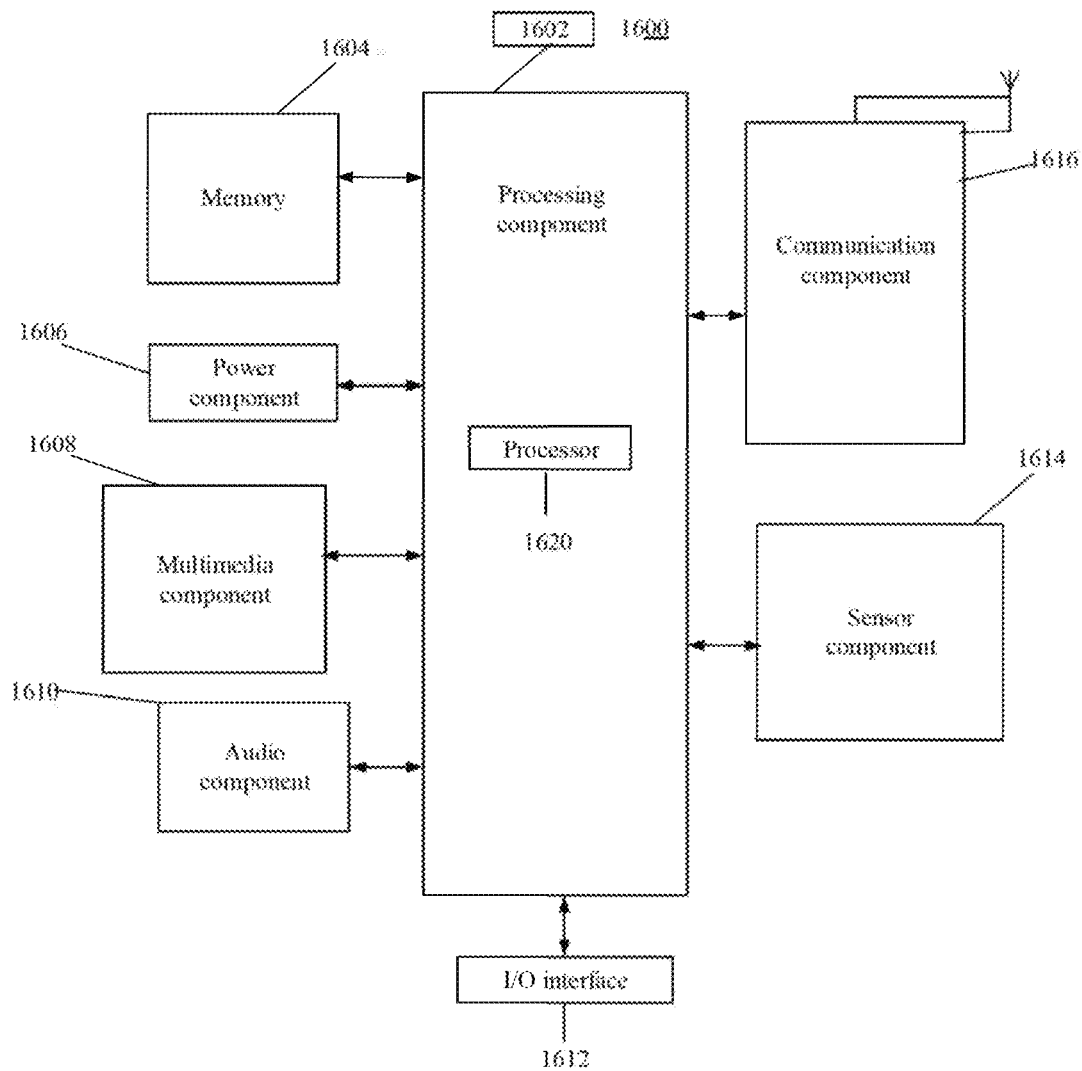
FIG. 10 is a block diagram of a video processing device according to an exemplary embodiment.

FIG. 10 is a block diagram of a video processing device 1600 according to an exemplary embodiment. For example, the device 1600 may be a mobile phone, a computer, a digital broadcast terminal, a messaging device, a gaming console, a tablet, a medical device, exercise equipment, a personal digital assistant, and the like.

Referring to FIG. 10, the device 1600 may include one or more of the following components: a processing component 1602, a memory 1604, a power component 1606, a multimedia component 1608, an audio component 1610, an Input/Output (I/O) interface 1612, a sensor component 1614, and a communication component 1616.

The processing component 1602 is typically configured to control overall operations of the device 1600, such as the operations associated with display, telephone calls, data communications, camera operations, and recording operations. The processing component 1602 may include one or more processors 1620 to execute instructions to perform all or part of the operations in the abovementioned method. Moreover, the processing component 1602 may include one or more modules which facilitate interaction between the processing component 1602 and other components. For instance, the processing component 1602 may include a multimedia module to facilitate interaction between the multimedia component 1608 and the processing component 1602.

The memory 1604 is configured to store various types of data to support the operation of the device 1600. Examples of such data include instructions for any application programs or methods operated on the device 1600, contact data, phonebook data, messages, pictures, video, etc. The memory 1604 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1606 is configured to provide power for various components of the device 1600. The power component 1606 may include a power management system, one or more power supplies, and other components associated with generation, management and distribution of power for the device 1600.

The multimedia component 1608 may include a screen providing an output interface between the device 1600 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1608 includes a front camera and/or a rear camera. The front camera and/or the rear camera may receive external multimedia data when the device 1600 is in an operation mode, such as a photographing mode or a video mode. Each of the front camera and the rear camera may be a fixed optical lens system or have focusing and optical zooming capabilities.

The audio component 1610 is configured to output and/or input an audio signal. For example, the audio component 1610 includes a Microphone (MIC), and the MIC is configured to receive an external audio signal when the device 1600 is in the operation mode, such as a call mode, a recording mode and a voice recognition mode. The received audio signal may further be stored in the memory 1604 or sent through the communication component 1616. In some embodiments, the audio component 1610 further includes a speaker configured to output the audio signal.

The I/O interface 1612 may provide an interface between the processing component 1602 and a peripheral interface module, and the peripheral interface module may be a keyboard, a click wheel, a button and the like. The button may include, but not limited to: a home button, a volume button, a starting button and a locking button.

The sensor component 1614 may include one or more sensors configured to provide status assessment in various aspects for the device 1600. For instance, the sensor component 1614 may detect an on/off status of the device 1600 and relative positioning of components, such as a display and a small keyboard of the device 1600, and the sensor component 1614 may further detect a change in a position of the device 1600 or a component of the device 1600, presence or absence of contact between the user and the device 1600, orientation or acceleration/deceleration of the device 1600 and a change in temperature of the device 1600. The sensor component 1614 may include a proximity sensor configured to detect presence of an object nearby without any physical contact. The sensor component 1614 may also include a light sensor, such as a Complementary Metal Oxide Semiconductor (CMOS) or Charge Coupled Device (CCD) image sensor, configured for use in an imaging application. In some embodiments, the sensor component 1614 may also include an acceleration sensor, a gyroscope sensor, a magnetic sensor, a pressure sensor or a temperature sensor.

The communication component 1616 is configured to facilitate wired or wireless communication between the device 1600 and other equipment. The device 1600 may access a communication-standard-based wireless network, such as a Wireless Fidelity (WiFi) network, a 2nd-Generation (2G) or 3rd-Generation (3G) network or a combination thereof. In an exemplary embodiment, the communication component 1616 may receive a broadcast signal or broadcast associated information from an external broadcast management system through a broadcast channel. In an exemplary embodiment, the communication component 1616 may further include a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In an exemplary embodiment, the device 1600 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including instructions, such as the memory 1604 including instructions, and the instruction may be executed by the processor 1620 of the device 1600 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

According to a non-transitory computer-readable storage medium, instructions in the storage medium may be executed by a processor of a mobile terminal to enable the mobile terminal to execute a video processing method. The method can include detecting a video-frame tagging operation in a process of recording a video, the video-frame tagging operation being configured to tag a video frame in a recorded video at different times in the process of recording the video, tagging the video frame at different times in the process of recording the video according to the video-frame tagging operation, and generating a final recorded video based on the tagged video frame and an untagged video frame.

The instruction in the storage medium may be executed by the processor of the mobile terminal to enable the mobile terminal to execute a video playing method. The method can include, in response to detecting a video output operation for a final recorded video, outputting the final recorded video based on the video output operation, displaying a video frame and a time axis on a video display interface, and displaying a tag of the video frame on the time axis, detecting a target-video-frame output operation for the tag of the video frame, making a skip from the video frame presently displayed on the video display interface to a target video frame according to the target-video-frame output operation, and continuously outputting video frames corresponding to each recording moment in the final recorded video starting from the target video frame according to a time sequence.

Other implementation solutions of the present disclosure will be apparent to those skilled in the art from consideration of the specification and practice of the present disclosure. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A video playing method, applied to a terminal device, the method comprising:

in response to detecting a video output operation for a recorded video including at least one tagged video frame and at least one untagged video frame, outputting the recorded video based on the video output operation;

displaying a video frame and a time axis on a video display interface, and in response to a tag control on the video display interface being clicked, displaying each tag corresponding to each of the at least one tagged video frame on the time axis, the tag control being independent from the time axis on the video display interface, each tag being associated with each of the at least one tagged video frame in response to a detection of a video-frame tagging operation while recording the recorded video, wherein one or more tags and associated one or more tagged video frames, which are not shown on the video display interface, appear on the video display interface in response to sliding a tag, which is currently shown on the video display interface, among the each tag along the time axis;

detecting a target-video-frame output operation for a tag of a target video frame among the at least one tagged video frame;

making a skip from the video frame presently displayed on the video display interface to the target video frame; and continuously outputting, beginning from the target video frame, video frames corresponding to each recording moment in the recorded video according to a time sequence.

2. The method of claim 1, wherein displaying each tag respectively corresponding to each of the at least one tagged video frame on the time axis comprises at least one of:

displaying each tag respectively corresponding to each of the at least one tagged video frame on the time axis as a text; or displaying each tag respectively corresponding to each of the at least one tagged video frame on the time axis as a picture, wherein content of the text and content of the picture form a corresponding relationship with a presently displayed tagged video frame.

3. A video playing device, comprising:

a processor; and a memory that is configured to store instructions executable by the processor, wherein the processor is configured to:

in response to detecting a video output operation for a recorded video including at least one tagged video frame and at least one untagged video frame, output the recorded video based on the video output operation;

display a video frame and a time axis on a video display interface, and in response to a tag control on the video display interface being clicked, display each tag corresponding to each of the at least one tagged video frame on the time axis, the tag control being independent from the time axis on the video display interface, each tag being associated with each of the at least one tagged video frame in response to a detection of a video-frame tagging operation while recording the recorded video, wherein one or more tags and associated one or more tagged video frames, which are not shown on the video display interface, appear on the video display interface in response to sliding a tag, which is currently shown on the video display interface, among the each tag along the time axis;

detect a target-video-frame output operation for a tag of a target video frame among the at least one tagged video frame;

make a skip from the video frame presently displayed on the video display interface to the target video frame; and continuously output, beginning from the target video frame, video frames corresponding to each recording moment in the recorded video according to a time sequence.

4. The device of claim 3, wherein the processor is further configured to execute at least one of:

displaying each tag respectively corresponding to each of the at least one tagged video frame on the time axis as a text; or displaying each tag respectively corresponding to each of the at least one tagged video frame on the time axis as a picture, wherein content of the text and content of the picture form a corresponding relationship with a presently displayed tagged video frame.

5. A terminal device implementing a method comprising:

in response to detecting a video output operation for a recorded video including at least one tagged video frame and at least one untagged video frame, outputting the recorded video based on the video output operation;

displaying a video frame and a time axis on a video display interface, and in response to a tag control on the video display interface being clicked, displaying each tag respectively corresponding to each of the at least one tagged video frame on the time axis, the tag control being independent from the time axis on the video display interface, each tag being associated with each of the at least one tagged video frame in response to a detection of a video-frame tagging operation while recording the recorded video, wherein one or more tags and associated one or more tagged video frames, which are not shown on the video display interface, appear on the video display interface in response to sliding a tag, which is currently shown on the video display interface, among the each tag along the time axis;

detecting a target-video-frame output operation for a tag of a target video frame among the at least one tagged video frame;

making a skip from the video frame presently displayed on the video display interface to the target video frame; and continuously outputting, beginning from the target video frame, video frames corresponding to each recording moment in the recorded video according to a time sequence, wherein the terminal device comprises a display screen configured to display the video frame and the time axis on the video display interface to be viewable by a user.

6. A non-transitory computer-readable storage medium, having instructions stored thereon that, when executed by a processor of a video playing device, enable the video playing device to execute the video playing method of claim 1.

* * * * *